United States Patent
Potter et al.

(10) Patent No.: US 7,165,249 B2
(45) Date of Patent: Jan. 16, 2007

(54) SYSTEMS AND METHODS FOR MODULAR COMPONENT DEPLOYMENT

(75) Inventors: Timothy Potter, Denver, CO (US); Mitch Upton, Highlands Ranch, CO (US); Christa Golding, Littleton, CO (US); Rick DeGrande, Littleton, CO (US)

(73) Assignee: BEA Systems, Inc., San Jose, CA (US)

( * ) Notice: Subject to any disclaimer, the term of this patent is extended or adjusted under 35 U.S.C. 154(b) by 565 days.

(21) Appl. No.: 10/400,821

(22) Filed: Mar. 27, 2003

(65) Prior Publication Data

US 2004/0015859 A1  Jan. 22, 2004

Related U.S. Application Data

(60) Provisional application No. 60/377,354, filed on May 2, 2002.

(51) Int. Cl.
*G06F 9/445* (2006.01)
*G06F 9/44* (2006.01)

(52) U.S. Cl. .................... 717/174; 717/107
(58) Field of Classification Search ........ 717/100–104, 717/106–108; 709/219; 719/318, 328
See application file for complete search history.

(56) References Cited

U.S. PATENT DOCUMENTS

| | | | |
|---|---|---|---|
| 5,321,841 A | 6/1994 | East et al. ................ | 395/725 |
| 5,748,975 A | 5/1998 | Van De Vanter .......... | 395/793 |
| 5,801,958 A | 9/1998 | Dangelo et al. | |
| 5,835,769 A | 11/1998 | Jervis et al. ............. | 395/701 |
| 5,836,014 A | 11/1998 | Faiman, Jr. .............. | 395/707 |
| 5,862,327 A | 1/1999 | Kwang et al. ......... | 395/200.33 |
| 5,933,838 A | 8/1999 | Lomet ..................... | 707/202 |
| 5,950,010 A | 9/1999 | Hesse et al. ............. | 395/712 |
| 5,961,593 A | 10/1999 | Gabber et al. ........... | 709/219 |
| 6,023,722 A | 2/2000 | Colyer .................... | 709/201 |

(Continued)

FOREIGN PATENT DOCUMENTS

WO  WO 01/90884 A2  11/2001

OTHER PUBLICATIONS

Erich Liebmann et al., "Adaptive Data Dissemination and Caching for Edge Service Architectures built with the J2EE", Mar. 2004, ACM Press, 2004 ACM Symposium on Applied Computing, pp. 1717-1724.*

(Continued)

*Primary Examiner*—Wei Zhen
*Assistant Examiner*—Anna Deng
(74) *Attorney, Agent, or Firm*—Fliesler Meyer LLP

(57) ABSTRACT

An integration component such as an application integration engine can be bundled as a single, self-contained J2EE Enterprise archive (EAR) file. The bundling of the component into an EAR file enables the component to be deployed to any valid system domain that is running and available. A recycling of the server then may be necessary only if a Java archive file is added to the classpath for non-system domains.

This description is not intended to be a complete description of, or limit the scope of, the invention. Other features, aspects, and objects of the invention can be obtained from a review of the specification, the figures, and the claims.

12 Claims, 2 Drawing Sheets

U.S. PATENT DOCUMENTS

| | | | |
|---|---|---|---|
| 6,028,997 A | 2/2000 | Leymann et al. | 395/701 |
| 6,044,217 A | 3/2000 | Brealey et al. | 395/701 |
| 6,067,548 A | 5/2000 | Cheng | 707/103 |
| 6,067,623 A | 5/2000 | Blakley, III et al. | 713/201 |
| 6,085,030 A | 7/2000 | Whitehead et al. | 395/200.33 |
| 6,119,149 A | 9/2000 | Notani | 709/205 |
| 6,141,686 A | 10/2000 | Jackowski et al. | 709/224 |
| 6,222,533 B1 | 4/2001 | Notani et al. | |
| 6,226,675 B1 | 5/2001 | Meltzer et al. | 709/223 |
| 6,230,287 B1 | 5/2001 | Pinard et al. | 714/31 |
| 6,230,309 B1 | 5/2001 | Turner et al. | |
| 6,237,135 B1 | 5/2001 | Timbol | 717/1 |
| 6,256,676 B1 | 7/2001 | Taylor et al. | |
| 6,282,561 B1 | 8/2001 | Jones et al. | |
| 6,282,711 B1 | 8/2001 | Halpern et al. | 717/11 |
| 6,324,681 B1 | 11/2001 | Sebesta et al. | |
| 6,336,122 B1 | 1/2002 | Lee et al. | 707/204 |
| 6,338,064 B1 | 1/2002 | Ault et al. | 707/9 |
| 6,349,408 B1 | 2/2002 | Smith | 717/11 |
| 6,353,923 B1 | 3/2002 | Bogle et al. | 717/4 |
| 6,393,605 B1 | 5/2002 | Loomans | 717/121 |
| 6,463,503 B1 | 10/2002 | Jones et al. | 711/114 |
| 6,549,949 B1 | 4/2003 | Bowman-Amuah | 709/230 |
| 6,594,693 B1 | 7/2003 | Borwankar | 709/219 |
| 6,604,198 B1 | 8/2003 | Beckman et al. | 713/167 |
| 6,732,237 B1 | 5/2004 | Jacobs et al. | 711/119 |
| 6,795,967 B1 | 9/2004 | Evans et al. | 719/310 |
| 6,802,000 B1 | 10/2004 | Greene et al. | 713/168 |
| 6,804,686 B1 | 10/2004 | Stone et al. | 707/104.1 |
| 2002/0016759 A1 | 2/2002 | Macready et al. | |
| 2002/0073080 A1 | 6/2002 | Lipkin | |
| 2002/0165936 A1 | 11/2002 | Alston et al. | |
| 2003/0018665 A1 | 1/2003 | Dovin et al. | |
| 2003/0041198 A1 | 2/2003 | Exton et al. | |
| 2003/0046266 A1 | 3/2003 | Mullins et al. | |
| 2003/0051236 A1* | 3/2003 | Pace et al. | 717/177 |
| 2003/0110117 A1 | 6/2003 | Saidenbereg et al. | |
| 2003/0115377 A1* | 6/2003 | Curtis et al. | 709/328 |
| 2003/0233631 A1 | 12/2003 | Curry et al. | |
| 2003/0236923 A1* | 12/2003 | Jeyaraman et al. | 709/318 |
| 2004/0015564 A1* | 1/2004 | Williams | 709/219 |
| 2004/0068568 A1 | 4/2004 | Griffin et al. | |
| 2004/0133660 A1 | 7/2004 | Junghuber et al. | |
| 2004/0205692 A1* | 10/2004 | Robinson | 717/100 |
| 2004/0225995 A1 | 11/2004 | Marvin et al. | |

OTHER PUBLICATIONS

U.S. Appl. No. 10/400,822, filed Mar. 27, 2003, Timothy Potter et al.

U.S. Appl. No. 10/402,819, filed Mar. 28, 2003, Timothy Potter et al.

U.S. Appl. No. 10/402,825, filed Mar. 28, 2003, Timothy Potter et al.

"Introducing Microsoft DotNet"; by ChristopheLauer, Jul. 2, 2002; http://web.archive.org/web/20020702162429/http://www.freevbcode.com/ShowCode.asp?ID=2171; pp. 1-10.

C. Mohan et al.; "Aries: A Transaction Recovery Method Supporting Fine-Granularity Locking and Partial Rollbacks Using Write-Ahead Logging"; ACM Transactions on Database Systems, vol. 17, No. 1, Mar. 1992, pp. 94-162.

Mariucci, Marcello; "Enterprise Application Server Development Environments"; Overview; University of Stuttgard. Oct. 10, 2000, pp. 1-10.

Sun Microsystems: "IPlanet Application Server 6.0 White Paper" Technical Reference Guide. May 25, 2000.

Roman, Ed and Richard Oberg; The Technical Benefits of EJP ban J2EE Technologies over COM + and Windows DNA. Dec. 1999.

Hewlett-Packard; "HP Application Server" technical guide version 8.0. 1999-2000.

Duvos, Enrique and Azer Bestavros. "An Infrastructure for the Dynamic Distribution of Web Applications and Services" Department of Computer Science, Boston University. Dec. 2000. pp. 4-12.

Paul, Laura Gibbone, "RosettaNet: Teaching business to work together", Oct. 1, 1999. http://www.developer.com/xml/article.php/616641.

Kunisetty, "Workflow Modeling and Simulation Using an Extensible Object-Oriented Knowledge Base Management System" CiteSeer, 1996, pp. 1-60.

Van Der Aalst et al., "Verification of XRL: An XML-Based Workflow Language" IEEE, Jul. 2001, pp. 427-432.

Blake, "Rule-Driven Coordination Agents: A Self-Configurable Agent Architecture for Distributed Control" IEEE, Mar. 2001; pp. 271-277.

Dahalin et al., "Workflow Interoperability Using Extensible Markup Language (XML)" IEEE, Jul. 2002; pp. 513-516.

International Search Report for PCT/US04/05621 dated Feb. 7, 2005 (1 pg).

Written Opinion for PCT/US04/05621 dated mailed May 11, 2005 (3 pgs).

International Search Report for PCT/US04/05256 dated Jan. 5, 2005 (3 pgs).

Written Opinion for PCT/US04/05256 dated mailed Mar. 7, 2005 (5 pgs).

* cited by examiner

SYSTEMS AND METHODS FOR MODULAR COMPONENT DEPLOYMENT

CLAIM OF PRIORITY

This application claims priority from U.S. provisional patent application "MODULAR DEPLOYMENT OF COMPONENTS", Application No. 60/377,354, filed May 2, 2002, incorporated herein by reference.

CROSS-REFERENCED CASES

The following applications are cross-referenced and incorporated herein by reference:

U.S. Provisional Application No. 60/377,322 entitled "Application View Transactions," by Timothy Potter et al., filed May 2, 2002.

U.S. Provisional Application No. 60/377,303 entitled "Adapter Deployment Without Recycle," by Timothy Potter et al., filed May 2, 2002.

U.S. Provisional Application No. 60/377,353 entitled "Shared Common Connection Factory," by Timothy Potter et al., filed May 2, 2002.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the deployment of software components across a system.

BACKGROUND

In existing integration systems, the primary use of an application integration (AI) component, such as an application view, is through a business process management (BPM) workflow. Potential consumers of an AI component, such as Web service developers and portal developers, will also require access to an Enterprise information system (EIS). However, like a business process engineer, these developers are not interested in dealing with the intricate details of a particular EIS. Further, the developers want access to the AI component with minimal installation, configuration, and administration overhead.

Certain components are tightly integrated with the integration system, such that system providers do not worry about providing integration flexibility. Users purchasing an integration system get a pre-configured integration domain. If a user wants to use system functionality with other domains, such as a Web portal domain, it is necessary for the user to do the integration.

BRIEF SUMMARY

Systems and methods in accordance with embodiments of the present invention can overcome deficiencies in existing integration systems by changing the way in which integration components are deployed to system domains. An integration component such as an application integration engine can be bundled as a single, self-contained J2EE Enterprise archive (EAR) file. The bundling of the component into an EAR file enables the component to be deployed to any valid system domain that is running and available. A recycling of the server can then be necessary only if a Java archive file is added to the classpath for non-system domains.

Other features, aspects, and objects of the invention can be obtained from a review of the specification, the figures, and the claims.

DETAILED DESCRIPTION

Systems and methods in accordance with embodiments of the present invention can allow application integration (AI) functionality to be imbedded deeply into an integration installation. In one such system, AI functionality can be bundled in an enterprise application archive (EAR) file that is available to any valid system domain. This packaging can retain backward compatibility with existing integration systems, while providing the lightweight solution that developers desire.

Such packaging can be used with modular deployment when, for example, a portal needs to access an EIS. Many such products and processes can leverage AI functionality. One purpose for using modular deployment is to make it as easy as possible to configure AI for downstream products. Presently, a user has to clean up what goes onto the classpath. It can be desirable to use Java™ 2 Enterprise Edition (J2EE) standards, as set forth by Sun Microsystems, Inc., of Santa Clara, Calif., such as using an Enterprise application. An end-user can use an EAR file, for example, to use application integration with a non-system domain.

Figure 1:
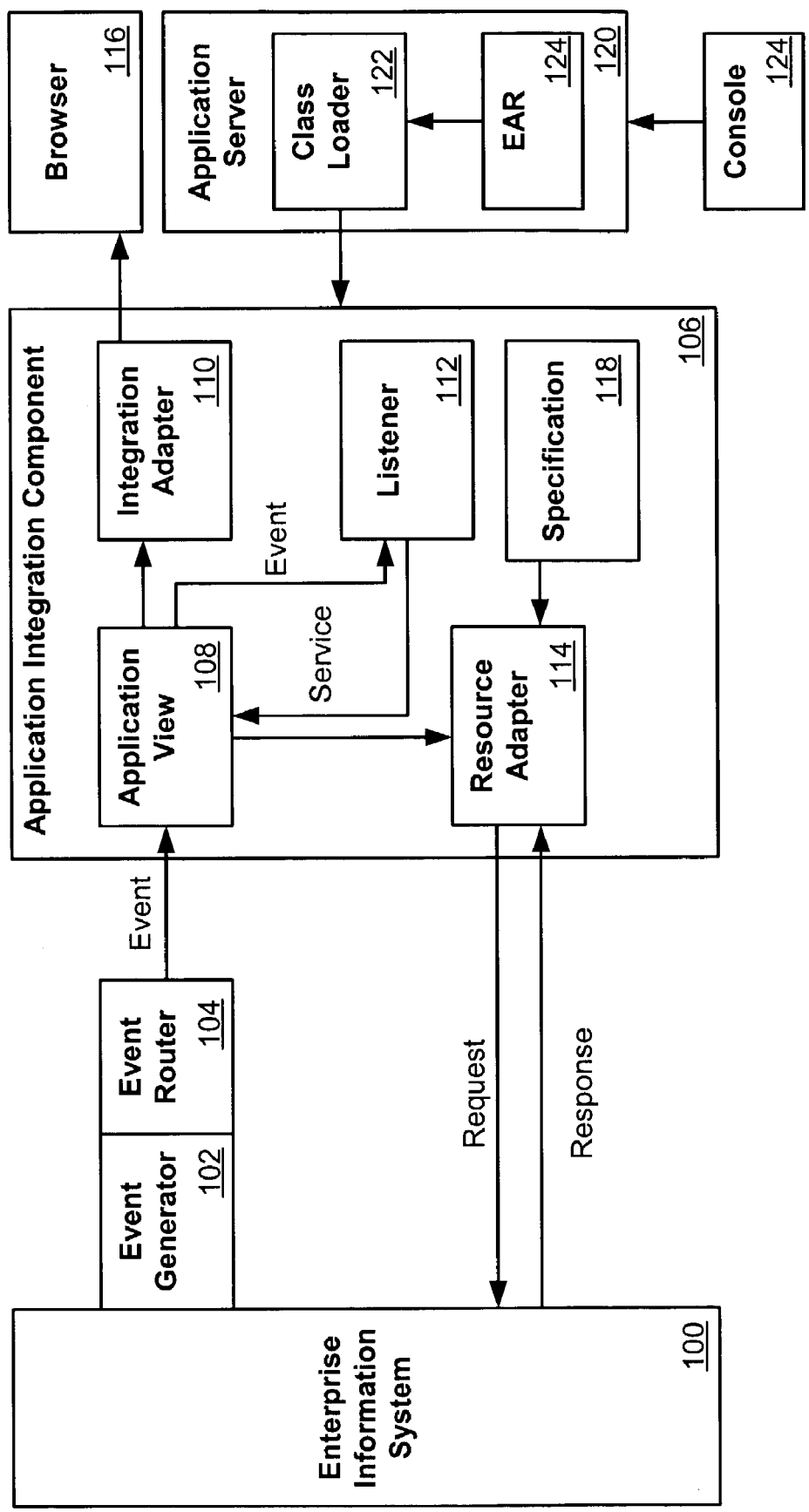
FIG. 1 is a diagram of a system in accordance with one embodiment of the present invention.

An exemplary integration system that can be used in accordance with embodiments of the present invention is shown in FIG. 1. An integration adapter 110 can include a Web application that allows a user to browse documents or business programming application interfaces (BAPIs) that are available in an EIS system 100, such as an SAP system, through a Web browser 116 without the Web application. A resource adapter 114 can be used to send requests to, and receive requests from, the EIS 100. The resource adapter 114 can also be used to implement the connector specification 118. An event router 104, which can also be a Web application, can be used to route messages from the EIS 100 to an application view 108 for the application integration component 106.

When an event occurs in the EIS 100, an event generator 102 can detect the event and determine whether anyone should receive this event. To do this, the event generator 102 can check the types of events that have subscriptions, which can be maintained by the event router 104. The event router can create an event object containing pertinent data about the event, and can sends the event object to the event router 104. The event router 104 can send the event object to any application view 108 that is subscribed to the type of event object received from the event generator 102. The application view 108 can receive the event object and notify any listener 112 registered for that type of event. Exemplary listeners can include integration process flow or custom business logic flow. A listener 112 can process the event object and determine whether a service should be invoked in response to the event.

The application view 108 can combine data from the event object with data held by the application view, such as in state variables, and can make a service invocation on a resource adapter 114. The application view can accept the service request and determine which interaction to request on the resource adapter 114. This mapping from service name to adapter interaction can allow the service to be business-centric and not system-function centric. The resource adapter 114 can carry out the request interaction with the EIS 100 and pass the data received from the application view 108. This data can then be viewed, such as through a Web browser 116, through the integration adapter 110.

Figure 2:
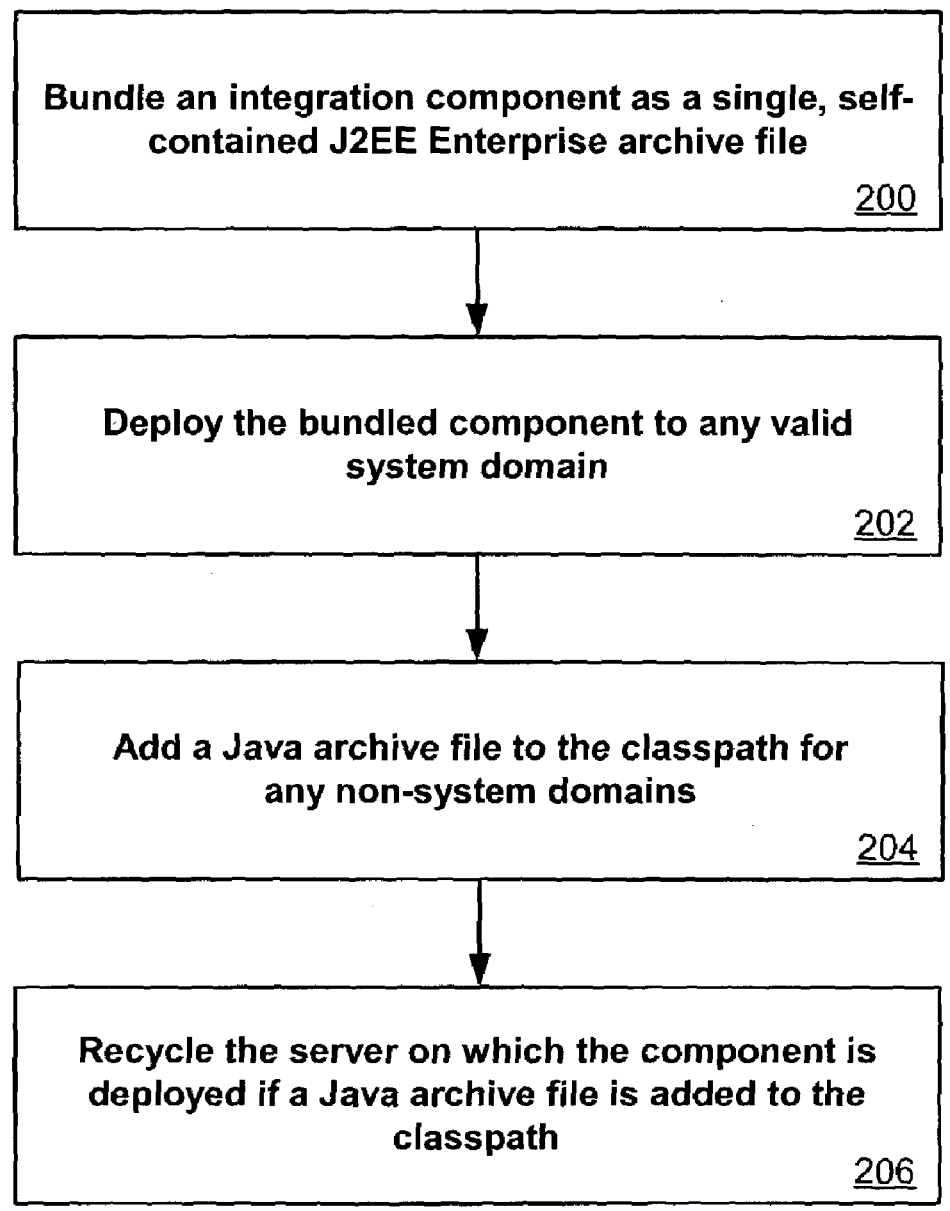
FIG. 2 is a flowchart showing a method that can be used with the system of FIG. 1.

As shown in the method of FIG. 2, an application component such as an AI engine can be bundled as a single, self-contained J2EE EAR file 200. This bundling can enable the AI engine to be deployed to any valid, running system domain 202. A user may still be required to re-cycle the server 206, as the user may need to add a Java archive (JAR) file to the classpath for non-system domains 204. A re-cycle may be needed due to classloading problems between an application view bean and a resource adapter, for example. Any classes that cross the bridge between an application view Enterprise JavaBean (EJB), which can be deployed from a system EAR file, to a resource adapter, which can be deployed in its own EAR file, can be loaded by the same classloader. In existing systems, the only way to have two Enterprise applications share a common class is to have that class on the system classpath. Consequently, a system EAR file cannot be deployed without a server re-cycle because the deployer will need to add a JAR file to the system classpath before starting the system.

An AI engine can use an integration repository for metadata persistence. The AI engine can rely on a pre-configured repository and associated Java Database Connectivity (JDBC) connection pool and data source. In this case, the AI engine deployer can provide the JDBC data source name and credentials at the time of deployment. The AI engine can assume that the repository has already been installed in the data source.

An application view engine can use Java Message Service (JMS) resources to handle events and asynchronous service invocations. To support these functions, an application view engine can use functionality such as a JMS Connection Factory, JMS Template, JMS JDBC Store, and/or JMS Server. In addition, an AI engine can define a request and response queue for handling asynchronous service invocations. The AI engine deployer is not forced to define the JMS resources before deploying the AI engine. Consequently, at least two modes of operation can be supported for determining which JMS resources to use.

The AI engine deployer can provide the name of pre-existing JMS resources, such as "JMSConnectionFactory" and "JMSServer". If a deployer provides the name for a JMS server, the developer may also need to configure the JMS JDBC store. The AI engine deployer does not need to provide the name of pre-existing JMS resources. The AI startup process can use JMS managed beans (MBeans) to define the necessary JMS resources.

AI startup and shutdown classes can be replaced by a Java HTTP servlet, such as "LifeCycleServlet". The servlet can be deployed in an integration Web application and loaded on startup. On startup, the servlet can also trigger the initialization sequence for the AI engine. The initial parameters provided to the servlet can serve as the configuration parameters for the AI engine. The user can change these parameters by editing a Web application descriptor, for example. A list of potential configuration parameters can include:

logLevel—can contain the verbosity level for AI logging deploymentRepositoryRootPath—can hold the location where the AI engine saves connection factory deployment descriptors hostUserID—can be used to allow a remote event router (i.e. deployed from a Web application) to authenticate itself to the server so the remote router can post events.

hostPassword—can store the password to allow a remote event router to authenticate itself to the server so that it can post events.

jms.autogen—a flag (boolean) that can allow the AI startup process to autogenerate JMS resources.

jms.serverName—name of the JMS Server on the local server jms.conn—JMS Connection Factory JNDI context repositoryDatasourceName—JDBC data source name An application view management console can provide a way to view the configuration parameters for the AI engine, such as by providing a link to a page containing these parameters. Starting and stopping an AI engine can be done from a console via deploying and/or undeploying the integration application that contains the application integration component.

Certain properties can be edited by a user using a configuration page, including properties such as logLevel, hostPassword, and hostUserID. Since BPM may not always be installed with AI, AI can provide a simple command-line import/export tool for application views. The output of this tool can be a JAR file containing any artifacts owned by the application view. The user can be required to manually import/export any artifacts that are not owned, but are used by the application view.

An example of a common AI JAR file that can be added to the server classpath at startup is "ai-core.jar." This exemplary JAR can contain:

log4j.jar contents logtoolkit.jar contents xmltoolkit.jar contents

AI.jar contents|_com/ai/*.dtd com/ai/common/*.class com/ai/message/*.class xcci.jar contents Such a JAR could be required for all clients of the AI system, for example. For integration domains, ai-core.jar can be added to a JAR such as "icommon.jar" so that the clients and server can access the base AI classes. Consequently, the AI experience for existing integration users can remain largely unchanged.

A client JAR, such as "ai-client.jar", can be used to contain any classes needed by clients of the AI engine, such as application view clients and resource adapter design time Web applications.

A server JAR file, such as "ai-server.jar," can contain all classes needed by the server-side components, and does not need to be included into any adapter EAR files or clients. For integration domains, ai-server.jar can be added to a server JAR such as iserver.jar so that server components can access the base AI server classes.

An MBean JAR file, such as "ai-mbean.jar," can be used to contain the application view MBeans and can be included on the system classpath for the integration server. For integration domains, ai-server.jar can be added to iserver.jar so that server components can access the MBean classes.

A server EJB JAR file, such as "ai-server-ejb.jar," can contain the base server classes and management EJBs. This JAR can be deployed before all other components of the AI engine, and can contain a startup EJB that can initialize AI.

An AI Web archive (WAR) file, such as "ai.war," can contain an application view management console Web application and the lifecycle servlet for the AI engine. An event processor EJB JAR file, such as "ai-eventprocessor-ejb.jar," can contain the event processing message driven EJB for handling AI events.

An asynchronous EJB JAR file, such as "ai-asyncprocessor-ejb.jar," can contain an asynchronous service processing message-driven EJB for handling asynchronous service invocations. A plug-in EJB JAR file, such as "ai-plugin-ejb.jar," can contain all classes for a plug-in for BPM. A plug-in WAR file, such as "ai-plugin.war," can contain the online help Web application for the AI Plug-in for BPM.

In order to configure deployment for integration domains that require AI, components such as the following can be added to an integration application element:

```
<EJBComponent Name="AI Server EJBs" Targets="myserver"
URI="ai-server-ejb.jar" DeploymentOrder="1"/>
<WebAppComponent Name="AI Application View Management
Console" Targets="myserver" URI="ai.war"
DeploymentOrder="2"/>
<EJBComponent Name="AI Event Processor Message Driven EJB"
Targets="myserver" URI="ai-eventprocessor-ejb.jar"
DeploymentOrder="3"/>
<EJBComponent Name="AI Async Service Processor Message Driven
EJB" Targets="myserver" URI="ai-asyncprocessor-ejb.jar"
DeploymentOrder="3"/>
<EJBComponent Name="AI Plug-In for BPM" Targets="myserver"
URI="ai-plugin-ejb.jar" DeploymentOrder="10"/>
<WebAppComponent Name="AI Plug-In for BPM Online Help"
Targets="myserver" URI="ai-plugin.war" DeploymentOrder="11"/>
```

For AI domains, there can be an AI EAR file, such as "ai.ear," which can contain any file needed to deploy the AI enterprise application outside of an AI domain. The EAR file can be structured as:

```
|_META-INF
|    |_application.xml (EAR file deployment descriptor)
|_ai.war (application view management console Web application)
|    |_WEB-INF
|        |_lib
|            |_Webtoolkit.jar
|_ai-server-ejb.jar (AI Management EJBs)
|    |_Startup EJB
|    |_ApplicationView EJB
|    |_SchemaManager EJB
|    |_DeployManager EJB
|    |_(ApplicationViewManager EJB
|    |_NamespaceManager EJB
|_ai-eventprocessor-ejb.jar
|_ai-asyncprocessor-ejb.jar
|_ibase.jar (ECI repository base classes)
|_irepository.jar (ECI repository classes)
```

Deployers may still need to add ai-core.jar to the system classpath and restart their server in some embodiments.

An application component such as the following can be added to the config.xml for the non-AI domain, or uploaded from the server console once the ai-core.jar file is on the classpath:

```
<Application Deployed="true" Name="Application Integration"
Path="<PATH_TO_EAR>/ai.ear">
<EJBComponent Name="AI Server EJBs" Targets="myserver"
URI="ai-server-ejb.jar" DeploymentOrder="1"/>
<WebAppComponent Name="AI Application View Management
Console" Targets="myserver" URI="ai.war"
DeploymentOrder="2"/>
<EJBComponent Name="AI Event Processor Message Driven EJB"
Targets="myserver" URI="ai-eventprocessor-ejb.jar"
DeploymentOrder="3"/>
<EJBComponent Name="AI Async Processor Message Driven EJB"
Targets="myserver" URI="ai-asyncprocessor-ejb.jar"
DeploymentOrder="3"/>
</Application>
```

A Plug-In for BPM may not be able to be deployed from the ai.ear file for AI domains.

An AI engine can use JMS resources such as a JMS server, a JMS connection factory, JMS queues, and JMS topics. If the JMS connection factory supplied by the user is not bound to a JNDI location, the factory can be cloned and bound to a location, such as com.ai.JMSConnectionFactory, so that internal AI components can be guaranteed to have access to a JMS connection factory. Queues that can be used include event queues, asynchronous request queues, and asynchronous response queues. Topics that can be used can include event topics, for example.

An AI engine can automatically define any necessary JMS resources that are not explicitly defined, such as for a standalone server and a cluster. This can free a user from having to define the resources, such as through a user interface (UI). Automatic definition can be done in a clustered or non-clustered environment. This can save the user from having to do an error-prone process of defining multiple JMS resources. This process can be relatively self-contained and can take care of defining necessary resources and dependencies. Using a system console to define multiple queues can be quite a tedious task, especially if the queues need to be distributed in a cluster.

A system administrator can simply specify configuration parameters such as the JMS server name (e.g., ai.jms.serverName ) and the JMS connection factory JNDI name (e.g., ai.jms.connectionFactoryJNDIName). In addition, if a user wishes to disable the auto-generation of JMS resources, the user can set a JMS auto-generation parameter, such as ai.jms.autogen, to 'false.' This can prevent the AI engine from attempting to auto-generate any JMS resources.

It may be desirable that adapters developed and tested on existing systems are able to run un-altered on systems in accordance with the present invention. If an adapter provider needs to rebuild an adapter against a new adapter development kit (ADK) that incorporates an embodiment in accordance with the present invention, the adapter provider may need to change the build procedure to account for new AI binary files such as those described above. Specifically, adapter developers may need to reference new JAR files such as the following:

```
<property name='AI_CORE' value='${AI_LIB_DIR}/ai-core.jar'/>
<property name='AI_CLIENT' value='${AI_LIB_DIR}/ai-client.jar'/>
<property name='AT_EVENTROUTER' value='${AI_LIB_DIR}/ai-eventrouter.jar'/>
```

Adapter developers may also need to change how they declare the environment property. In one embodiment, this declaration can be implemented as, for example:

<property environment='env'/>

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for the modular deployment of a integration component, comprising:
   bundling an integration component as an enterprise archive file wherein the integration component includes an application view bean and a resource adapter for connecting to an enterprise information system;
   deploying the integration component to a valid system domain from the enterprise archive file wherein the system domain includes a class path that contains a common class shared by the application view bean and the resource adapter;
   adding a Java archive file that packages the common class to class paths for any non-system domains; and
   re-cycling a server on which the integration component is deployed if a Java archive file is added to the class path for a non-system domain.

2. A method according to claim 1, further comprising: recycling a server for the valid system domain.

3. A method according to claim 1 wherein the resource adapter carries out request interaction with the enterprise information system.

4. A method according to claim 3 wherein the application view bean maps service requests to interactions with the resource adapter.

5. A method according to claim 1, wherein:
   bundling the integration component allows the integration component to be backward compatible with existing integration systems.

6. A method according to claim 1, wherein:
   deploying the integration component allows the integration component to utilize JMS resources available to the valid system domain.

7. A method according to claim 1, further comprising:
   configuring parameters for the integration component using a management console.

8. A computer-readable medium, comprising:
   means for bundling an integration component as an enterprise archive file wherein the integration component includes an application view bean and a resource adapter for connecting to an enterprise information system;
   means for deploying the integration component to a valid system domain from the enterprise archive file wherein the system domain includes a class path that contains a common class shared by the application view bean and the resource adapter;
   means for adding a Java archive file that packages the common class to class paths for any non-system domains; and
   means for re-cycling a server on which the integration component is deployed if a Java archive file is added to the class path for a non-system domain.

9. A computer program product stored in a computer readable medium for execution by a server computer for deploying an adapter, comprising:
   computer code for bundling an integration component as an enterprise archive file wherein the integration component includes an application view bean and a resource adapter for connecting to an enterprise information system;
   computer code for deploying the integration component to a valid system domain from the enterprise archive file wherein the system domain includes a class path that contains a common class shared by the application view bean and the resource adapter;
   computer code for adding a Java archive file that packages the common class to class paths for any non-system domains; and computer code for re-cycling a server on which the integration component is deployed if a Java archive file is added to the class path for a non-system domain.

10. A computer system comprising:
    a processor;
    object code executed by said processor, said object code configured to:
      bundle an integration component as an enterprise archive file wherein the integration component includes an application view bean and a resource adapter for connecting to an enterprise information system;
      deploy the integration component to a valid system domain from the enterprise archive file wherein the system domain includes a class path that contains a common class shared by the application view bean and the resource adapter;
      add a Java archive file that packages the common class to class paths for any non-system domains; and
      re-cycle a server on which the integration component is deployed if a Java archive file is added to the class oath for a non-system domain.

11. A computer system stored in a computer-readable medium for modular deployment of a integration component, comprising:
    an integration component including an application view and a resource adapter for connecting to an enterprise information system wherein the integration component is bundled as an enterprise archive file; and
    a valid system domain including a class path wherein the integration component is deployed by using the enterprise archive file;
    wherein the re-cycling of a server is necessary only if a Java archive file is added to the class path for non-system domains.

12. A computer readable medium having instructions thereon which when executed by one or more processors cause a system to:
    bundle an integration component as an enterprise archive file wherein the integration component includes an application view bean and a resource adapter for allowing a user to connect to an enterprise information system;
    deploy the integration component to a valid system domain from the enterprise archive file wherein the system domain includes a class path that contains a common class shared by the application view bean and the resource adapter;

add a Java archive file that packages the common class to class paths for any non-system domains; and re-cycle a server on which the integration component is deployed if a Java archive file is added to the class path for a non-system domain.

* * * * *